(12) United States Patent
Clark et al.

(10) Patent No.: US 6,516,594 B2
(45) Date of Patent: Feb. 11, 2003

(54) PROTECTIVE DEVICE FOR SHOD ANIMALS

(76) Inventors: James England Clark, 1711 Stockton Hill Rd. #A299, Kingman, AZ (US) 86401; William E. Hart, 6308 Pises, Agoura Hills, CA (US) 91301

(*) Notice: Subject to any disclaimer, the term of this patent is extended or adjusted under 35 U.S.C. 154(b) by 0 days.

(21) Appl. No.: 09/815,887

(22) Filed: Mar. 23, 2001

(65) Prior Publication Data

US 2001/0011594 A1 Aug. 9, 2001

Related U.S. Application Data

(63) Continuation-in-part of application No. 09/481,777, filed on Jan. 11, 2000, now Pat. No. 6,381,930.

(51) Int. Cl.[7] ................................................ B68C 5/00
(52) U.S. Cl. ......................................................... 54/82
(58) Field of Search ............................. 168/17, 18, 20; 54/82

(56) References Cited

U.S. PATENT DOCUMENTS

| 44,522 A | * | 10/1864 | Forker ........................ 168/20 |
| 4,470,466 A | * | 9/1984 | Nakanishi ..................... 168/18 |
| 5,148,872 A | * | 9/1992 | Dallmer ....................... 168/11 |
| 5,983,611 A | * | 11/1999 | Smahl et al. .................. 54/82 |

FOREIGN PATENT DOCUMENTS

GB             461657     *   2/1937  ................. 54/82

* cited by examiner

*Primary Examiner*—Robert P. Swiatek
(74) *Attorney, Agent, or Firm*—Tope-McKay & Associates

(57) ABSTRACT

A protective device 104 for hoofed animals fabricated of a durable and flexible material. The protective device 104 includes a base 106 and a wall 108, with the wall designed to enclose a hoof 100 of an animal such as a horse or cow. The protective device 104 includes a mechanism for size adjustment 216 such as a sizing opening 214 in combination with a plurality of tread grooves 304, which assists in the adjustment of the size and shape of the hoof to fit a variety of hoofs. The protective device 104 preferably includes a shear-relief portion 302 formed such that the front of a hoof has minimal contact with the device 104. Ease of installation, decreased impact, and improved traction are all benefits provided by the protective device 104 disclosed.

21 Claims, 8 Drawing Sheets

PROTECTIVE DEVICE FOR SHOD ANIMALS

RELATED APPLICATIONS

This application is a continuation in part of application Ser. No. 09/481,777 titled Protective Device for Hoofed Animals, filed on Jan. 11, 2000, now U.S. Pat. No. 6,381,930, issued May 7, 2002.

TECHNICAL FIELD

The present invention relates generally to hoof protection, and more particularly to shoes for hoofed animals such as horses, ponies, mules, cattle, and the like.

BACKGROUND OF THE INVENTION

Horses have been shod with metal shoes held in place by nails since the advent of the Iron Age. Horse shoeing was necessary to protect and support the hoof while horses engaged in activities beyond their natural ability due to the softness of their feet. Since horses hooves are uniquely shaped, iron offered several advantages. Iron is easily shaped, and may be affixed to the hoof with metal nails to accommodate a horse's individual needs. Also, iron protects the hoof from chipping and increases the sole's distance from the ground. In addition to these advantages, the shape of the horseshoe effectively increases the weight bearing surface area of the hoof, which, in turn, increases a horse's stability.

Today's domestic horse is faced with very different challenges than those encountered in nature, such as the presence of slippery road surfaces and the need to engage in high-performance sports. While steel shoes offer a horse a high degree of protection and support, they have many shortcomings. First, steel shoes generally lack traction on hard surfaces, and are poor shock absorbers. Second, steel shoes are too heavy for certain horses and may cause problems such as interference with limb motion. Third, steel shoes generally require installation by a person possessing specialized skills such as a professional farrier. Fourth, nails present an inherent risk of injury due to misplacement in the hoof. Fifth, horseshoes may be shaped incorrectly and may alter the horse's natural movement and cause damage over time. Sixth, use of the wrong size of shoe may lead to a host of hoof and leg ailments. Finally, all shoes affixed with nails run the risk of being thrown with devastating results if the shoe is ripped from the hoof, injuring both the hoof wall and the limb. Over time, attempts have been made to address these problems with varying degrees of success.

Aluminum horseshoes help to solve the issues of traction, shock absorption, weight, and, to a lesser extent, support. Aluminum shoes are made in three basic varieties, racehorse shoes, orthopedic shoes, and therapeutic shoes. However, aluminum shoes have several shortcomings, including short useful life and high cost.

Equine boots, such as those provided in U.S. Pat. Nos. 5,692,569; 5,588,288; 5,528,885; 4,174,754; 3,732,929; and 3,703,209 provide various examples of alternative devices that address the issues of traction and shock absorption without the use of traditional horseshoes. Some of the general characteristics common to these devices are as follows. They are designed to provide for easy installation, and are primarily utilized to provide a temporary solution for a missing or thrown shoe. They fit over the hoof, and are generally made from solid rubber, or other synthetic material with treads on the sole portion. While useful temporarily, these devices are typically heavy and clumsy, and substantially detract from a horse's performance. In some cases, the added weight of these devices causes interference between the horse's limbs. Additionally, the typically awkward shape of these devices makes them difficult for riders to carry, despite the fact that carrying them as a field-based horseshoe replacement is one of principle reasons they are purchased. Equine boots also tighten around the hoof with closures that can be clogged, damaged or broken by rocks, debris, or rugged terrain. In addition to excessive weight and clumsy design, these devices also tend to rub the bulbs of the hoof heels. This may cause sensitivity, bleeding and lameness in the heel area, rendering the horse unusable. Equine boots come in a variety of sizes but in only one standard shape, making them extremely difficult to install and to properly conform to hooves that differ from the standard design. To address this flaw, silicone inserts and adhesives are used to keep some of these devices affixed to the hoof making them extremely difficult to remove. The materials typically used in equine boots make it difficult for horse owners to modify them.

To avoid the need for nails, glue-on shoes have also been developed, which attach to the hoof through the use of tabs that are affixed to the hoof wall. There are generally two varieties of glue-on shoes. The first variety includes shoes fabricated from plastic, polyurethane, or other synthetic material that cannot be shaped to accommodate the unique shape of a horse's hoof. Some glue-on shoes of this variety, however, are made from softer materials that bend against the wall of the hoof, but which fail to conform to the wall's shape. This design absorbs impact, provides some traction, and eliminates the issues surrounding nailed shoes. However, the tabs of these devices are easily scraped from the wall when the horse negotiates uneven terrain or encounters deep footing. Additionally, soft glue-on shoes typically lack adequate support, as they fail to conform properly to the hoof wall. Another drawback of glue-on shoes is that they must be installed by a person having special skills such as a farrier, and are thus costly and inconvenient to install. The second type of glue-on shoe is similar to the first, except that it contains a soft metal core, typically aluminum. This addition was intended to allow unique shaping on an anvil or other bending apparatus. This customization is difficult because the hammer tends to bounce off the outer material during the shaping process, with little or no change to the core. As a result, a shaper must strike harder, resulting in an increased chance of damaging the outer material during the shaping process. Because of the design, sharp bends are difficult, if not impossible, to accomplish.

Polyurethane or synthetic shoes are affixed to the hoof with nails. They address issues related to shock absorption, traction and support. These devices have a standard shape and cannot be adequately fashioned to accommodate unique hoof shapes. This results in shoe material extending beyond a horse's normal support surface, increasing the risk of horseshoe loss resulting from snagging. Polyurethane or synthetic shoe varieties sometimes include a metal core help to solve this problem by allowing for size alteration via grinding. However, if the metal core becomes exposed, the shoe's effective life decreases substantially. Synthetic shoes come in a variety of styles (including bar shoes, bar shoes with clips, open shoes, and open shoes with clips) and sizes, but are not easily adaptable to the unique shape and size of an individual horse's hoofs. These devices also have the disadvantages associated with nails such as lameness due to nail misplacement, tearing of the hoof wall when the shoe is thrown, and the necessity of professional installation.

Hard facing caulks were developed as further attempts to adapt steel shoes to situations where horses require traction. Hard facing is a method by which a farrier or skilled professional spreads expensive high carbon metal chips (typically borium or titanium) contained in an adhesive flux over a horseshoe's impact points. This extends the life of the shoe and increases traction on hard surfaces. The primary problem with hard facing is localized shock. Over time the areas hoof that are beneath the hard facing begin to delaminate. This increases the chance of abscesses, seedy toe, white line disease, and Laminitis. While this device, when functioning properly, is effective for achieving traction, it may cause injury to an animal's joints, tendons, and ligaments.

Horseshoe pads as exemplified in U.S. Pat. No. 5,199,498; rim pads as exemplified in U.S. Pat. No. 4,565,250; and therapeutic pads as exemplified in U.S. Pat. No. 4,775,011 are used to reduce shock, prevent bruising and address therapeutic issues such as ring bone, side bone, Laminitis, navicular disease, tendon and ligament sprains, coffin bone and navicular bone fractures, splints, as well as other hoof and limb injuries or aliments. Horseshoe pads are affixed between the hoof and shoe and are available in many varieties, which generally fit into the three categories mentioned above: full pads, rim pads, and therapeutic pads. Full pads cover the plantar surface of a horse's hoof completely. Rim pads cover only the area of the hoof that comes in contact with the shoe. This open center allows the bottom of the hoof to grab in deep footing and soft surfaces. The open center also makes cleaning of the hoof easier. Therapeutic pads come in many shapes and cover the entire hoof or portions of it. Design choices may result in redirected or reduced pressure, changed balance, and protection for certain structures. Current horseshoe pads suffer from several drawbacks. The thickness of the pad weakens the connection between the shoe and the hoof by placing stress on the thinner portion of the nails used to affix shoe and pad to the hoof. Also, full pads tend to cause the hoof to harbor bacteria. Hoof packing is used to combat this effect. However, eventually the packing gets pushed out, and bacteria incubate causing problems such as abscesses, thrush, seedy toe, and white line disease. Furthermore, full pads can cause an anvil-like effect against the sole of the hoof, mitigating the intended effect when the sole is not properly prepared or when the wrong packing is used.

Therefore, it is an object of the present invention to overcome the problems just discussed, and to provide a protective device for hoofed animals which is preferably fabricated from a resilient and elastic material, and which is adaptable to a variety of hoof sizes.

SUMMARY OF THE PRESENT INVENTION

The present invention is a protective device for hoofed animals comprising: a body portion 105 in a substantially hoof-like shape including: a base portion 106 formed in a substantially ring-like fashion forming a central opening 212 having a central axis perpendicular to the central opening, the base portion including a perimeter, bottom, a top, a front, and a rear. The body also consists of a wall portion 108 formed around the perimeter of the top of the base portion 106 and extending upward and inward at an angle generally toward the central opening 212. In addition, a sole portion 210 formed on bottom of the base portion and extending inward toward the central axis of the central opening 212, such that it forms a support surface for a hoof upon application of the device, said sole portion 210 including a ground surface 118 formed on the bottom of the base portion 106 to provide a walking surface when the device is applied, and a means for attaching the sole portion of the base portion to a hoof, whereby a hoof may be detachably attached to the device with the device substantially conforming to the circumference of the hoof.

The protective device for hoofed animals, wherein the means for attaching the sole portion of the base portion 106 to a hoof 100, includes at least one hole to provide for attachment with a device selected from the group consisting of nails, screws, and caulks. Additionally, a portion of the rear 224 is removable to assist in properly conforming the device to a hoof. The protective device has a rear portion 224 that is removable to assist in properly conforming the device to a hoof. The base portion 106 further includes a rolled edge 120 formed circumferentially around at least a portion of the base portion 106 and adjoining the ground surface 118 of the sole portion 210 in order to prevent the device from catching against the ground as steps are taken. The device provides a means for detachably attaching the body portion 105 to a hoof provides a circumferential closure causing the device to conform to a hoof.

The sole portion 210 includes a tread bevel 306, formed in the ground surface 118 and extending inwardly and upwardly toward the central opening 212 of the device in order to prevent debris accumulation between the sole portion 118 and an animal's hoof as well as in the central opening 212. In addition, the ground surface 118 of the sole portion 210 further includes a plurality of tread grooves 304 in communication with the central opening 212, and extending radially from the central opening 212, with the tread grooves 304 formed to assist in size and shape adjustment of the device around a hoof.

The base portion 106 of the device 104 includes a vertical thickness, said thickness being variable for different sections of the base portion 106 to assist in correcting for an animal's particular needs. The device 104 is custom-fitted to a particular horse and the device may be fabricated by the process of injection molding.

These and other features and advantages of the present invention will be apparent to those skilled in the art from the following detailed description, taken together with the accompanying drawings, in which like reference materials refer to like parts.

DETAILED DESCRIPTION

Figure 1:
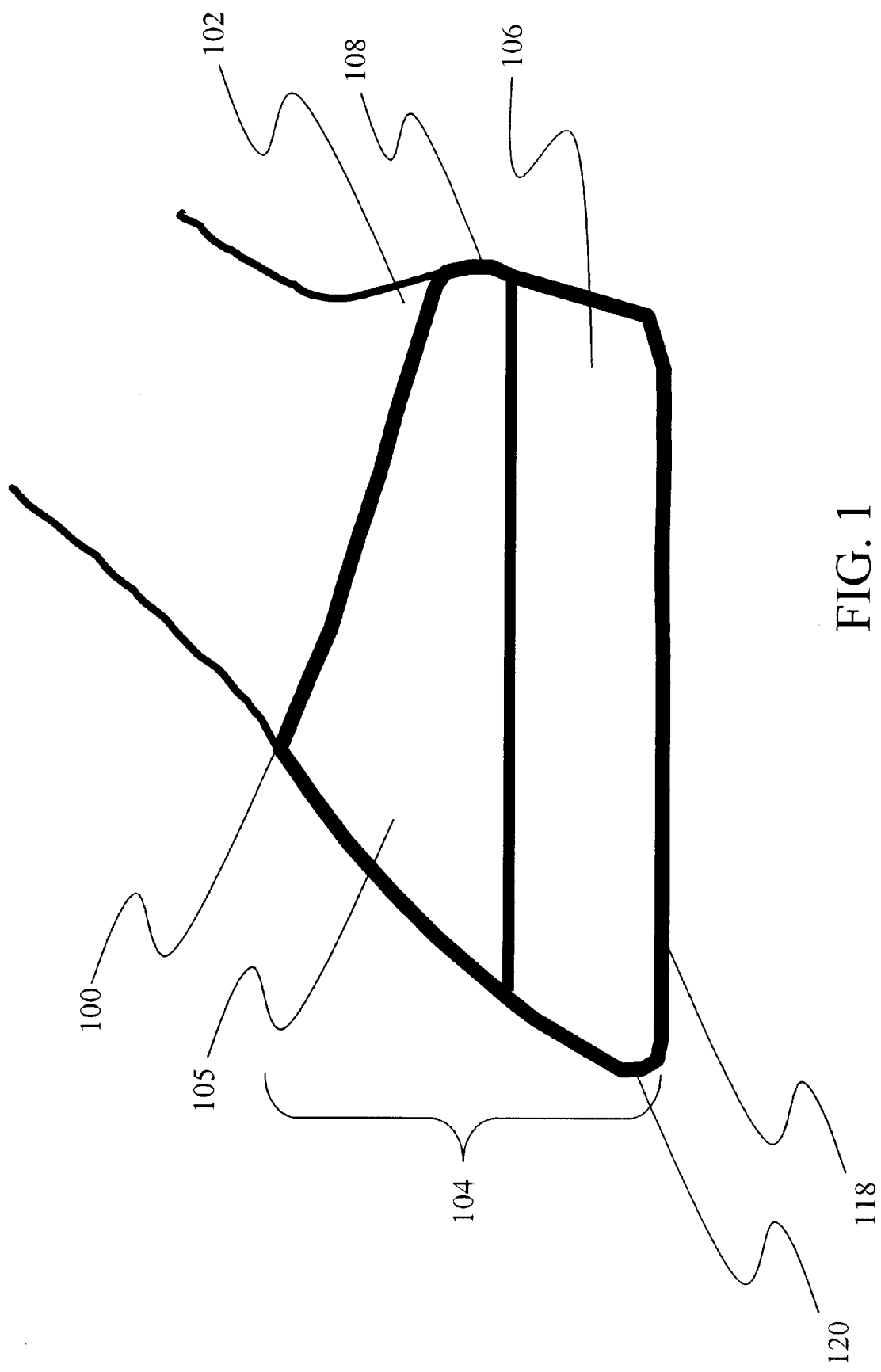
FIG. 1 presents a side view of the present invention as applied to a horse's hoof.

The present invention is useful to provide a protective device for hoofed animals that may be tailored to a variety of applications. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein. Specifically, although the embodiments described herein are discussed relative to horse hoofs, other embodiments may readily be fabricated for use with other hoofed animals without varying from the scope of the present invention.

The present invention presents a novel and useful protective device for hoofed animals. An embodiment of the device of the present invention is presented in FIG. 1, as applied to a horse's hoof 100. The hoof 100 and pastern 102 of the horse are shown, along with the device 104 of the present invention. As shown, the device 104 includes a body portion 105 having a base 106 and a wall 108 which enclose the hoof 100, fitting around and beneath. The device 104 is fabricated of a flexible, resilient, and durable material such as certain plastics or rubbers, to assist in shape and size adjustment and to accommodate a variety of hoofs 100 with only minor adjustments. The base 106 of the device 104, as shown, further includes a ground surface 118, which may be designed to include a means for providing traction for the hoof 100, e.g. cleats or tread, to provide better footing for the animal. A rolled toe 120 is also shown on the base 106, to ensure that the device 104 does not catch against the ground as steps are taken.

Figure 2:
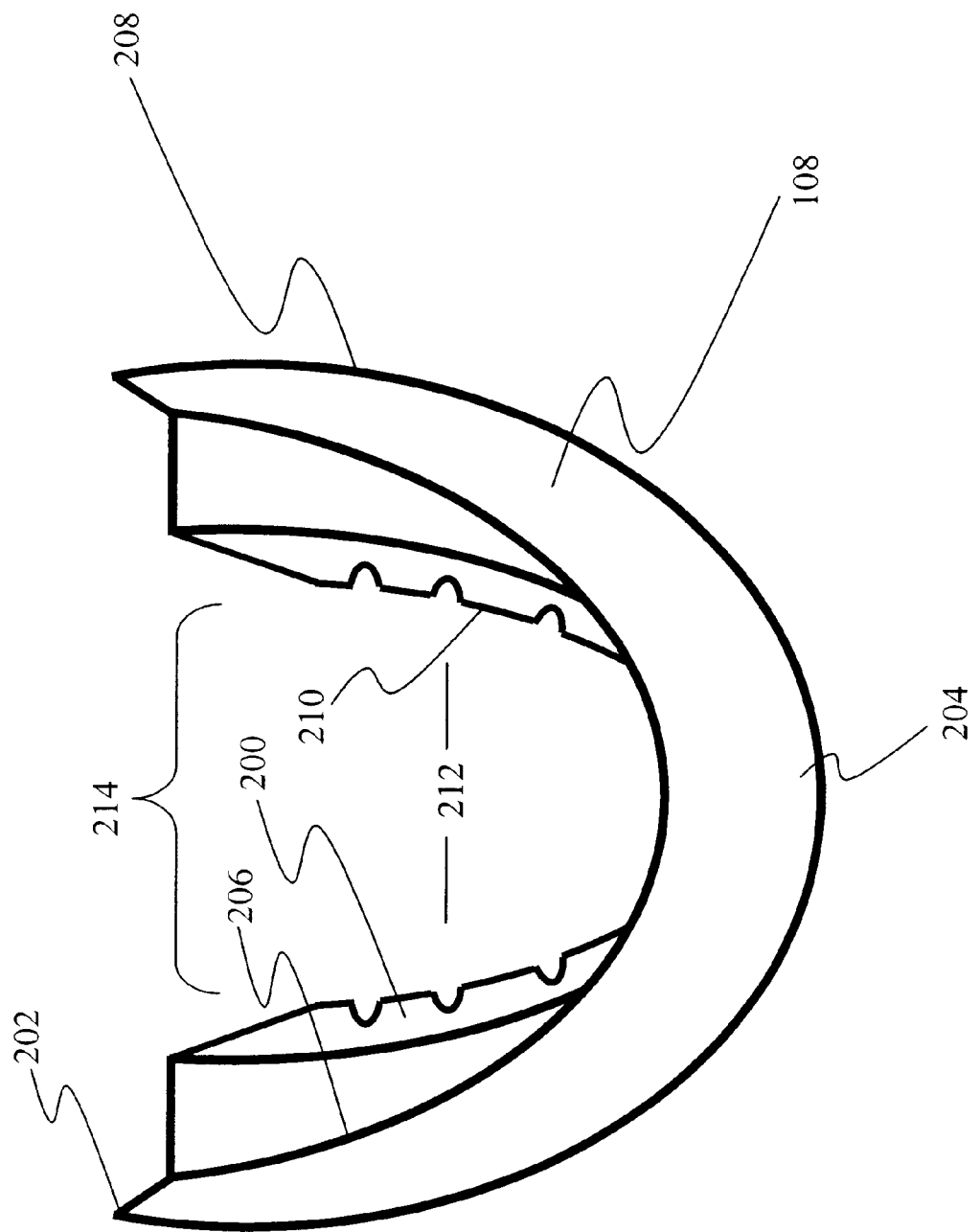
FIG. 2 presents a perspective view of an embodiment of the present invention, unapplied.

A perspective view of the device 104 of the present invention is shown in FIG. 2, unapplied. As can be seen in FIG. 2, the wall 108 is defined by a posterior section 202, an anterior section 204, an inside 206, and an outside 208. Additionally, it can be seen that the base 106 includes a sole portion 210, which covers a portion of the bottom of an animal's hoof. The sole portion 210, as shown in FIG. 2, preferably has a central opening 212 and a sizing opening 214, which comprise a means for size adjustment in order assist in allowing the device 104 to be fitted to hoofs of varying sizes. In operation, the device 104 is fitted around the hoof 100 of an animal, and is held in place by the friction between the inside portion 206 of the wall 200 and the hoof 100.

Figure 3:
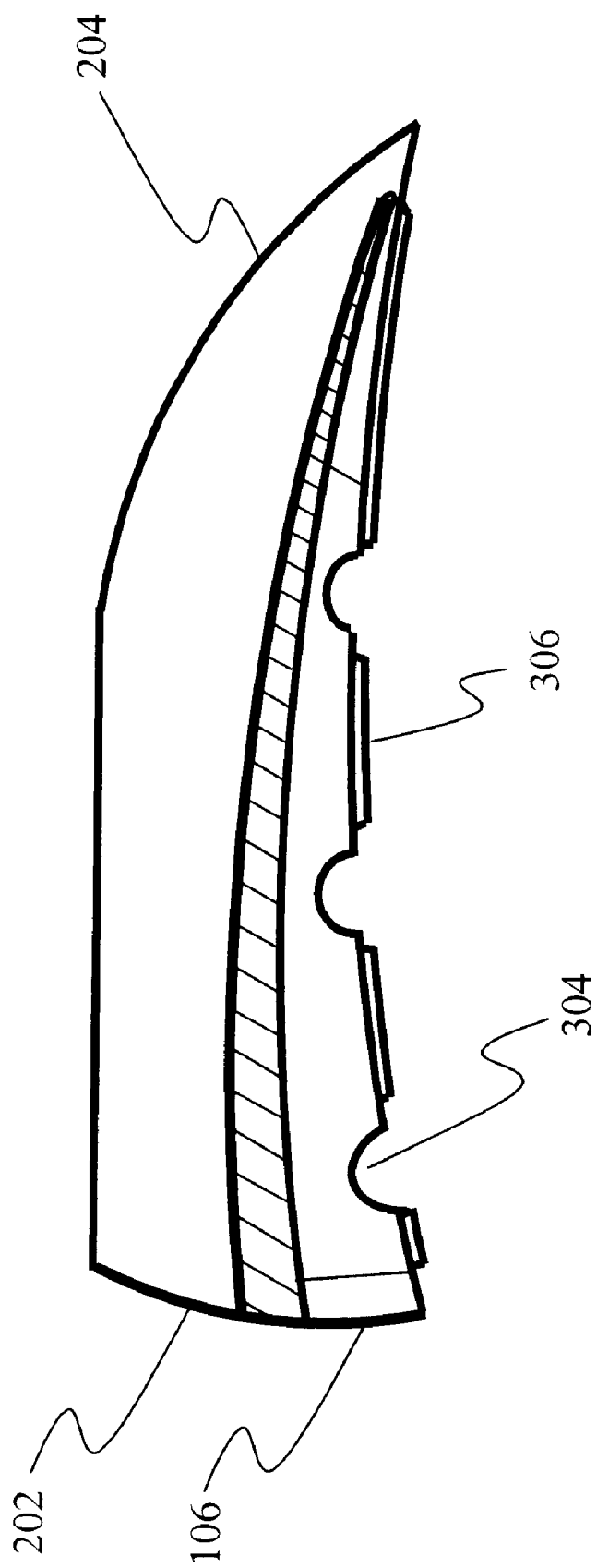
FIG. 3 presents a cross-sectional view of the an embodiment of the present invention, unapplied.

A cross-sectional view of an embodiment of the device 104 of the present invention is shown in FIG. 3, unapplied. The base 106 of the device 104 is shown with tread grooves 304, which are preferably formed as angled cavities formed radially from the central opening 212, and which assist in providing the means for size adjustment 216 by enhancing the circumferential flexibility of the base 106 in fitting around the hoof 100. The tread grooves 304 are preferably formed such that they narrow toward the central opening 212, and are open toward the ground surface 118 of the base 106. A base bevel 306 is also shown, the angular nature of which causes a tight seal against the bottom of the hoof to help prevent debris from gathering between the hoof 100 and the ground surface 118. The angular nature of the base bevel 306 causes it to form a tight, lip-like seal against the bottom of the hoof.

Figure 4:
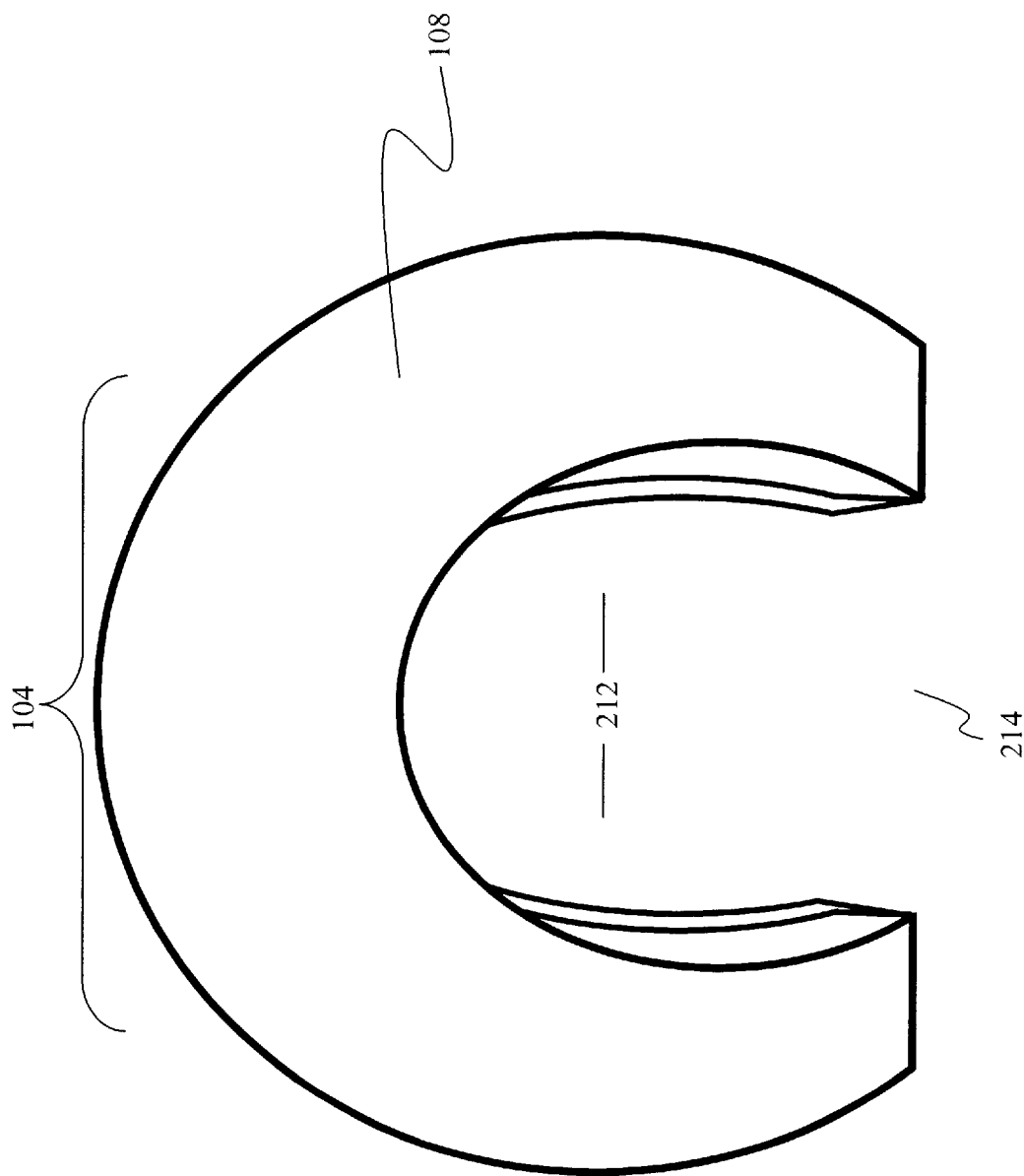
FIG. 4 presents a top view of an embodiment of the present invention, unapplied.
Figure 5:
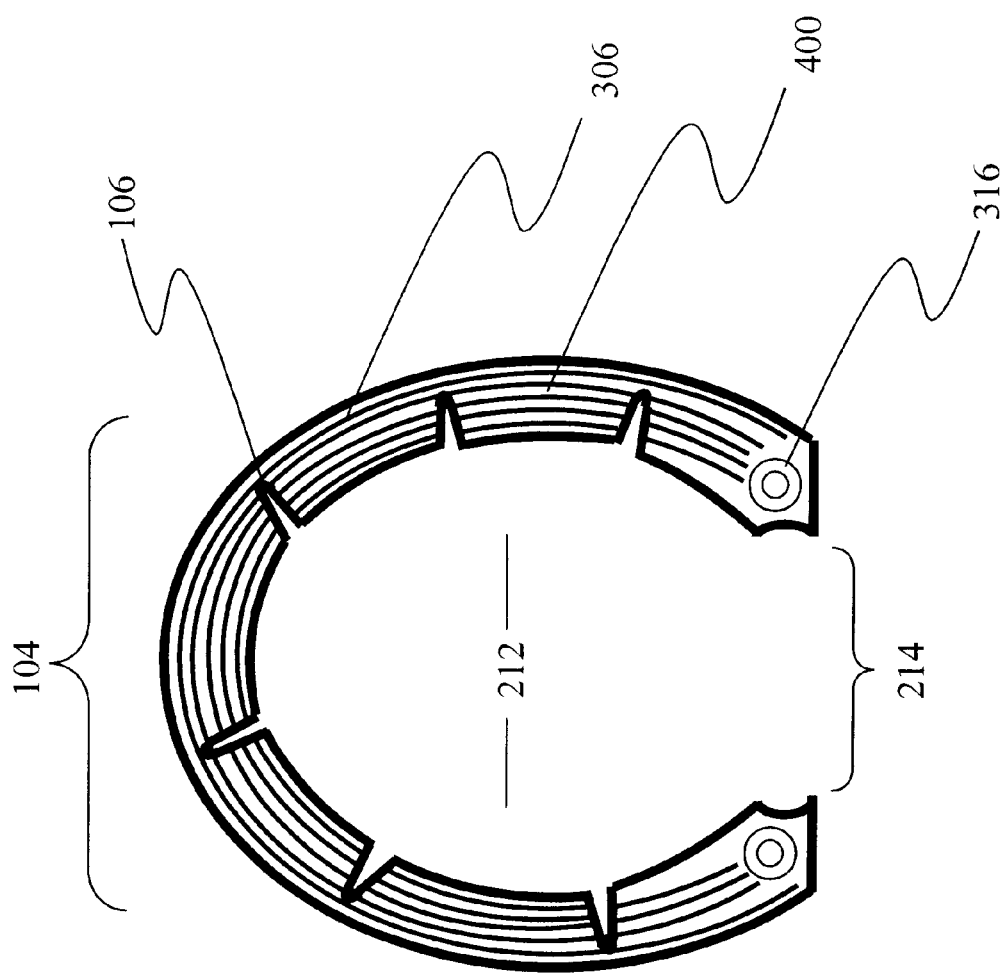
FIG. 5 presents a bottom view of an embodiment of the present invention, showing the tread and sizing grooves in detail.

A top view and a bottom view of an unapplied embodiment of the present invention are shown in FIG. 4 and FIG. 5, respectively, with all numbered portions corresponding to those previously described. All other parts are as shown in FIGS. 1, 2, and 3. A bottom view of an embodiment of the present invention, showing the tread, sizing grooves, and hole in detail is shown in FIG. 5. The tread grooves 304, the central opening 212, and the sizing opening 214 are all chosen to assist in allowing the device 104 to be fitted to hoofs 100 of varying sizes. The base bevel 306 may be seen more clearly as a flexible portion, which is designed to provide traction between the base 106 and the ground. The holes 316 are provided to assist in the placement of screw-in caulks or the like, such that the hoof 100 or shoe may be secured more firmly to the device 104. It is important to note that the inside 206 of the wall 108 is angled inward toward the central opening 212 in order to properly fit against the sides of a hoof 100. The actual angle also varies around the circumference of a hoof 100 to provide a proper fit, and may be specifically tailored to a particular size range or type of animal. The variation in the angle may be seen in FIG. 3 between the front section 204 and the rear section 202 of the wall 108. The flexibility of the material that forms the device 104 enables a single device 104 to be used for a variety of hoofs 100.

Figure 6A:
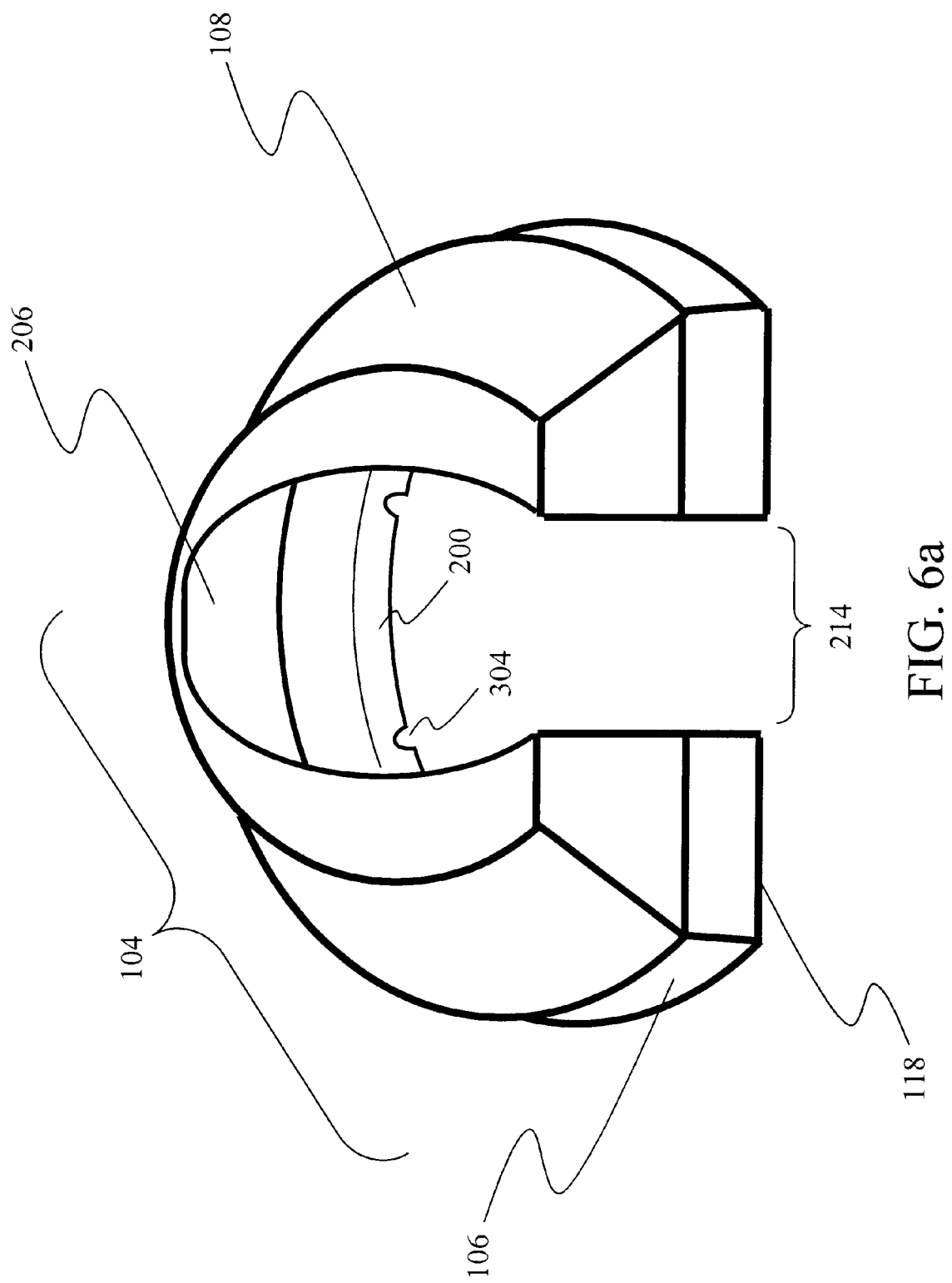
FIG. 6a presents a back view of an embodiment of the present invention, detailing an example closure and sizing means.

A back-view of an embodiment of the present invention is shown in FIG. 6a. All of the labeled elements are as presented with regard to FIGS. 1, 2, 3, 4, and 5 and are shown in the back-view of FIG. 6a for further clarity.

Figure 6B:
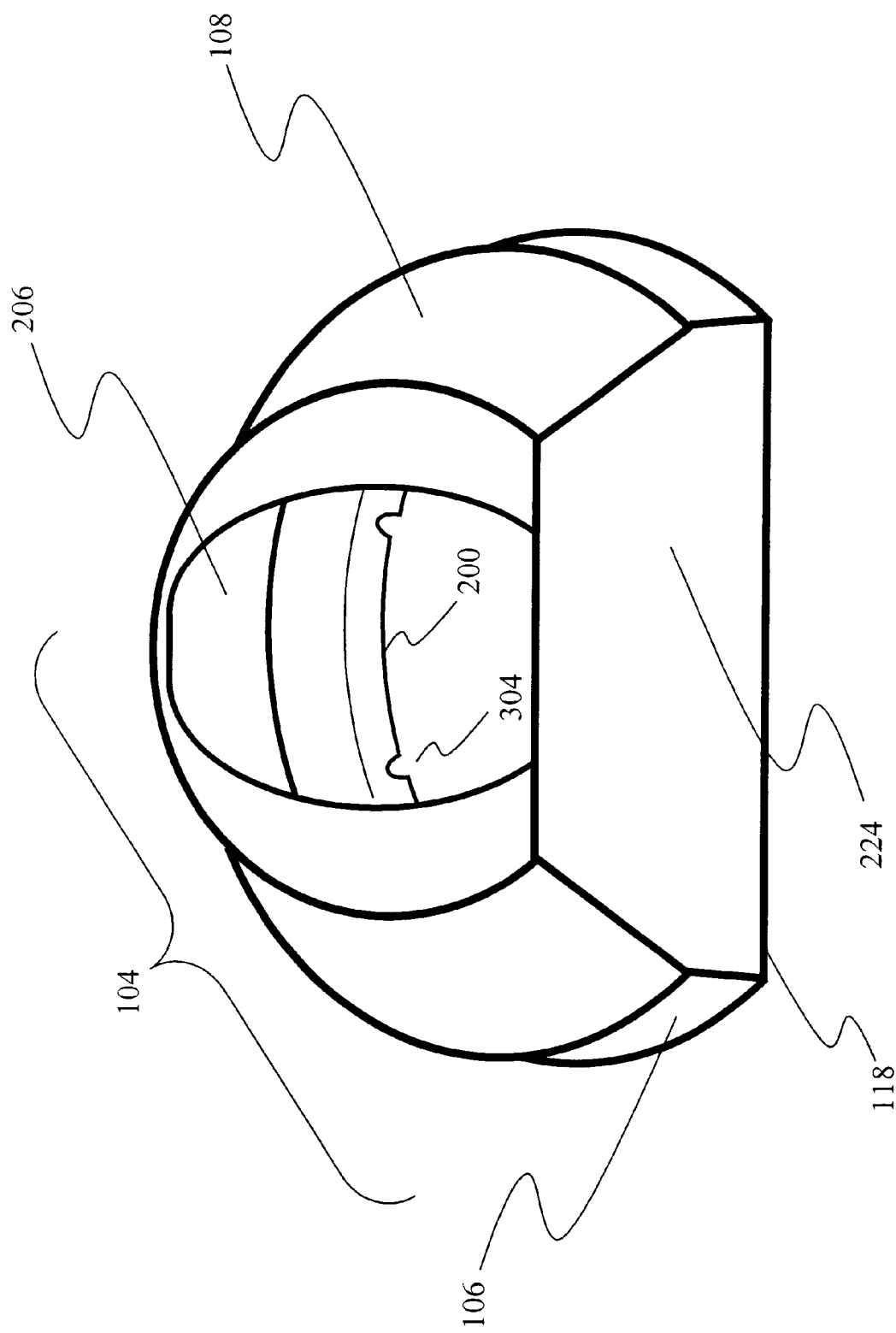
FIG. 6b presents a back view of an embodiment of the present invention.

A back-view of an alternative embodiment is shown in FIG. 6b. All of the labeled elements are presented with regard to FIGS. 1, 2, 3, 4, and 5 and are shown in the back-view of FIG. 6a for further clarity.

Figure 7:
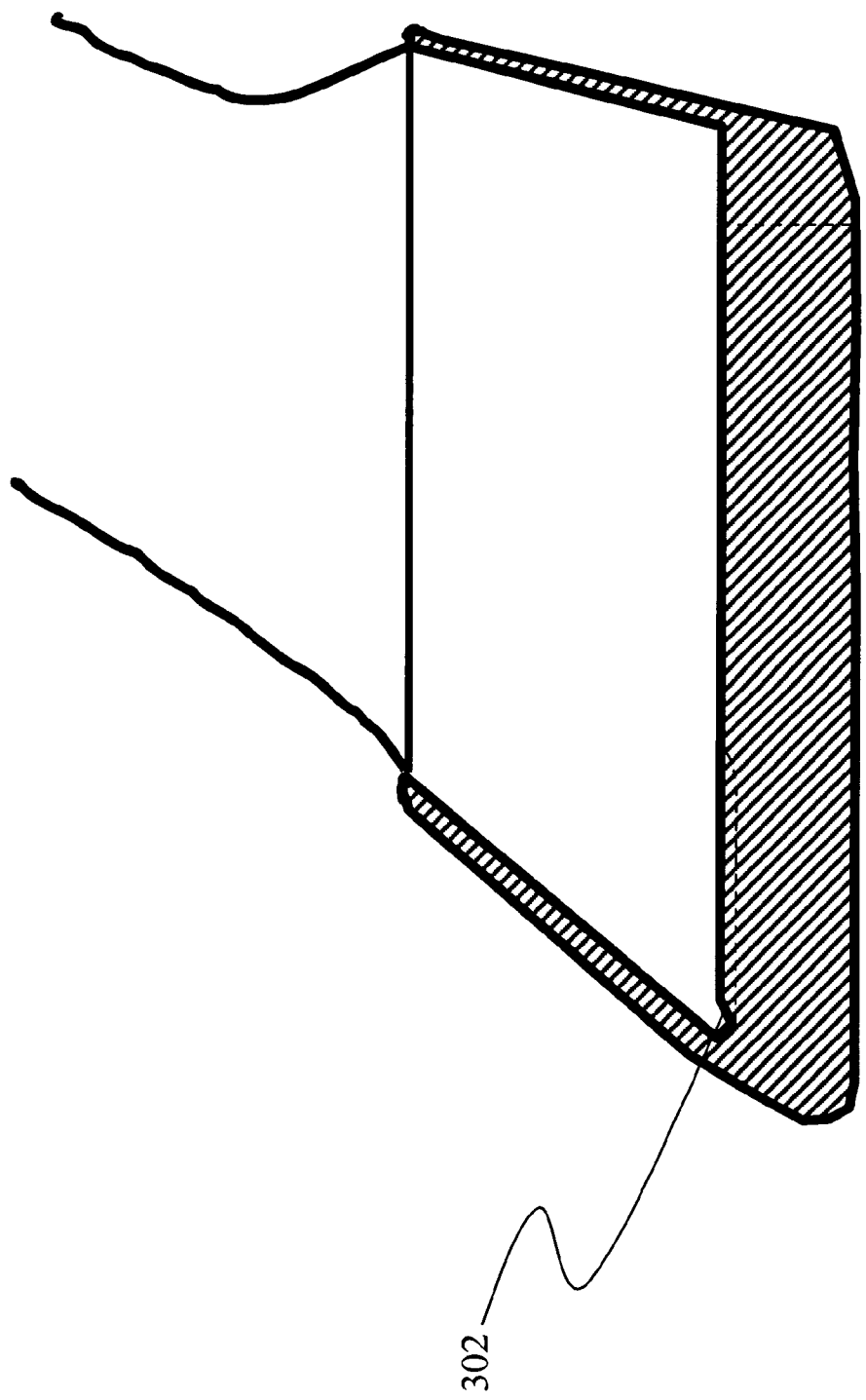
FIG. 7 is a cutaway view of an embodiment of the present invention more clearly depicting the groove-like shear-relief portion.

FIG. 7 is a cutaway of the device, which shows more clearly the shear-relief portion 302. The shear-relief portion 302 is provided in the front portion of the device in order to prevent the forward portion of a hoof or horseshoe from cutting through the device during use. The shear-relief portion is preferably formed in a groove-like fashion and is intended to enhance the durability of the device.

The device 104 of the present invention may be used in conjunction with horseshoes in order to provide padding in situations where the hard impact of horseshoes is undesirable, such as in the case of a police horse operating on sidewalks and streets. Various modifications may be made, such as the provision of cleats, base 106 with a smaller ground surface 118 to tailor the device 104 for use in high-performance sporting events. Furthermore, the device 104 may be fabricated with cutting guides, to allow tailoring by the user to provide an improved fit for a particular animal. This feature may be particularly important for veterinarians, who work with many animals of varying sizes and who do not want to maintain the inventory required to provide for all. It may also be important for use in the field, where pack weight is important, and where a group of riders may wish to carry only a few shoe replacements that are adjustable to a wide group of animals. Because of the flexible and tailorable nature of the device 104, specific embodiments may be developed to fulfill user needs.

In addition to use with medical boots, the device 104 may be used in many other applications and in combination with various medical devices. For example, it may be applied to the hind feet of a mare during breeding to prevent the stallion from being kicked. Also, it may be applied in confined spaces so horses cannot step on, or hit themselves while being transported or confined for medical purposes. Furthermore, the device 104 may be used with many other leg devices such as bell boots, leg wraps, and various pads.

Finally, it is important to note that although the embodiments discussed above include tread grooves 304 to assist in size and shape adjustment in order to accommodate hoofs 100 of varying sizes, customized embodiments may be created through the use of custom molds suited for use with a particular horse.

What is claimed is:

1. A protective device for hoofed animals comprising:
   a. a body portion 105 in a substantially hoof-like shape including:
      i. a base portion 106 formed in a substantially ring-like fashion forming a central opening 212 having a central axis perpendicular to the central opening, the base portion including a perimeter, bottom, a top, a front, and a rear;
      ii. a wall portion 108 formed around the perimeter of the top of the base portion 106 and extending upward and inward at an angle generally toward the central opening 212;
      iii. a sole portion 210 formed on bottom of the base portion and extending inward toward the sole central axis of the central opening 212, such that it forms a support surface for a hoof upon application of the device, said sole portion 210 including a ground surface 118 formed on the bottom of the base portion 106 to provide a walking surface when the device is applied; and
      iv. wherein the body portion 105 further includes a groove-like shear-relief portion 302 at the intersection of the wall portion 108 and the base portion 106, said shear-relief portion 302 opening roughly toward the central opening 212 and extending only about the toe of the base portion, whereby the shear-relief portion provides a means for protecting the material of the device from being punctured or cut by the hoof of the animal; and
   b. a means for attaching the sole portion of the base portion to a hoof, whereby a hoof may be detachably attached to the device with the device substantially conforming to the circumference of the hoof and without substantial size adjustment.

2. A protective device for hoofed animals as set forth in claim 1, wherein the means for attaching the sole portion of the base portion to a hoof includes at least one hole 316 to provide for attachment with a device selected from the group consisting of nails, screws, and caulks.

3. A protective device for hoofed animals as set forth in claim 2, wherein rear portion is removable to assist in properly conforming the device to a hoof.

4. A protective device for hoofed animals as set forth in claim 1, wherein a portion of the rear is removable to assist in properly conforming the device to a hoof.

5. A protective device for hoofed animals as set forth in claim 1, wherein the base portion 106 further includes a rolled edge 120 formed circumferentially around at least a portion of the base portion 106 and adjoining the ground surface 118 of the sole portion 210 in order to prevent the device from catching against the ground as steps are taken.

6. A protective device for hoofed animals as set forth in claim 1, wherein the means for detachably attaching the body portion 105 to a hoof provides a circumferential closure causing the device to conform to a hoof.

7. A protective device for hoofed animals as set forth in claim 1, wherein the sole portion 210 includes a tread bevel 306, formed in the ground surface 118 and extending inwardly and upwardly toward the central opening 212 of the device in order to prevent debris accumulation between the sole portion 118 and an animal's hoof as well as in the central opening 212.

8. A protective device for hoofed animals as set forth in claim 1, wherein the ground surface 118 of the sole portion 210 further includes a plurality of tread grooves 304 in communication with the central opening 212, and extending radially from the central opening 212, with the tread grooves 304 formed to assist in size and shape adjustment of the device around a hoof.

9. A protective device as set forth in claim 1, fabricated by the process of injection molding.

10. A protective device as set forth in claim 1 wherein the base portion 106 of the device 104 includes a vertical thickness, said thickness being variable for different sections of the base portion 106 to assist in correcting for an animal's particular needs.

11. A protective device as set forth in claim 1, wherein the device 104 is custom-fitted to a particular horse.

12. A protective device for hoofed animals comprising:
   a. a body portion 105 in a substantially hoof-like shape including:
      I. a base portion 106 formed in a substantially U-shaped fashion forming a central opening 212 having a central axis perpendicular to the central opening, the base portion including a perimeter, bottom, a top, and a front;
      II. a wall portion 108 formed around the perimeter of the top of the base portion 106 and extending upward and inward at an angle generally toward the central opening 212;
      III. a sole portion 210 formed on bottom of the base portion and extending inward toward the central axis of the central opening 212, such that it forms a support surface for a hoof upon application of the device, said sole portion 210 including a ground surface 118 formed on the bottom of the base portion 106 to provide a walking surface when the device is applied; and
      IV. wherein the body portion 105 further includes a groove-like shear-relief portion 302 at the intersection of the wall portion 108 and the base portion 106, said shear-relief portion 302 opening roughly toward the central opening 212 and extending only about the toe of the base portion, whereby the shear-relief portion provides a means for protecting the material of the device from being punctured or cut by the hoof of the animal; and
   b. a means for attaching the sole portion of the base portion to a hoof, whereby a hoof may be detachably attached to the device with the device substantially conforming to the circumference of the hoof and without a substantial size adjustment.

13. A protective device for hoofed animals as set forth in claim 12, wherein the means for attaching the sole portion of the base portion to a hoof includes at least one hole to provide for attachment with a device selected from the group consisting of nails, screws, and caulks.

14. A protective device for hoofed animals as set forth in claim 12, wherein a portion of the rear 224 is removable to assist in properly conforming the device to a hoof.

15. A protective device for hoofed animals as set forth in claim 12, wherein the base portion 106 further includes a rolled edge 120 formed circumferentially around at least a portion of the base portion 106 and adjoining the ground surface 118 of the sole portion 210 in order to prevent the device from catching against the ground as steps are taken.

16. A protective device for hoofed animals as set forth in claim 12, wherein the means for detachably attaching the body portion 105 to a hoof provides a circumferential closure causing the device to conform to a hoof.

17. A protective device for hoofed animals as set forth in claim 12, wherein the sole portion 210 includes a tread bevel 306, formed in the ground surface 118 and extending inwardly and upwardly toward the central opening 212 of the device in order to prevent debris accumulation between the sole portion 118 and an animal's hoof as well as in the central opening 212.

18. A protective device for hoofed animals as set forth in claim 12, wherein the ground surface 118 of the sole portion 210 further includes a plurality of tread grooves 304 in communication with the central opening 212, and extending radially from the central opening 212, with the tread grooves 304 formed to assist in size and shape adjustment of the device around a hoof.

19. A protective device as set forth in claim 12, fabricated by the process of injection molding.

20. A protective device as set forth in claim 12 wherein the base portion 106 of the device 104 includes a vertical thickness, said thickness being variable for different sections of the base portion 106 to assist in correcting for an animal's particular needs.

21. A protective device as set forth in claim 12, wherein the device 104 is custom-fitted to a particular horse.

* * * * *